(12) United States Patent
Saito et al.

(10) Patent No.: US 12,403,792 B2
(45) Date of Patent: Sep. 2, 2025

(54) BATTERY REPLACEMENT APPARATUS AND BATTERY REPLACEMENT METHOD

(71) Applicant: TOYOTA JIDOSHA KABUSHIKI KAISHA, Toyota (JP)

(72) Inventors: Mamoru Saito, Toyota (JP); Shin Inoue, Okazaki (JP); Naoki Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/512,931

(22) Filed: Nov. 17, 2023

(65) Prior Publication Data

US 2024/0181923 A1    Jun. 6, 2024

(30) Foreign Application Priority Data

Dec. 5, 2022 (JP) ................. 2022-194354

(51) Int. Cl.
*B60L 53/80* (2019.01)
*B60L 50/60* (2019.01)
*B60L 53/66* (2019.01)
*B60L 53/62* (2019.01)
*B60L 58/13* (2019.01)

(52) U.S. Cl.
CPC .............. *B60L 53/80* (2019.02); *B60L 50/66* (2019.02); *B60L 53/62* (2019.02); *B60L 58/13* (2019.02)

(58) Field of Classification Search
CPC .......... B60L 53/80; B60L 50/66; B60L 53/62; B60L 58/13; B60L 50/64; Y02T 10/70; B60S 5/06
See application file for complete search history.

(56) References Cited

U.S. PATENT DOCUMENTS

2012/0233850 A1* 9/2012 Hozumi ................. B60L 50/66
29/729

FOREIGN PATENT DOCUMENTS

JP    2012-192783 A    10/2012

* cited by examiner

*Primary Examiner* — Rodney A Butler
(74) *Attorney, Agent, or Firm* — Dinsmore & Shohl LLP

(57) ABSTRACT

A battery replacement apparatus includes a detection device that detects position and orientation of a battery (first battery), a battery mount where a battery (second battery) is placed, the battery mount being capable of being raised, and an adjuster that adjusts position and orientation of the battery that is placed on the battery mount. The battery mount allows the battery to be attached to a vehicle body from below the vehicle body, by being raised below the vehicle body in a state where the battery is placed on the battery mount. The adjuster adjusts the position and the orientation of the battery placed on the battery mount, based on the position and the orientation of the battery detected by the detection device.

4 Claims, 15 Drawing Sheets

BATTERY REPLACEMENT APPARATUS AND BATTERY REPLACEMENT METHOD

CROSS REFERENCE TO RELATED APPLICATIONS

This nonprovisional application is based on Japanese Patent Application No. 2022-194354 filed on Dec. 5, 2022 with the Japan Patent Office, the entire contents of which are hereby incorporated by reference.

BACKGROUND

Field

The present disclosure relates to a battery replacement apparatus and a battery replacement method.

Description of the Background Art

Japanese Patent Laying-Open No. 2012-192783 discloses a battery replacing apparatus for replacing a battery of an electric vehicle. The battery replacing apparatus removes a first battery that is attached to an electric vehicle, and attaches a second battery to the electric vehicle. Each of the first battery removed from the electric vehicle and the second battery is carried on a battery mount portion that is driven below the electric vehicle. A position of the first battery to be removed from the electric vehicle is detected by a laser range finder at a time of removal of the first battery. Moreover, at a time of attachment of the second battery, a position of the battery mount portion is adjusted such that the second battery is moved to the position of the first battery detected by the laser range finder.

SUMMARY

However, even when the position of the battery mount portion is adjusted as described in Japanese Patent Laying-Open No. 2012-192783, it is sometimes difficult to attach a battery to the electric vehicle due to the position of the battery on the battery mount portion not being constant. Accordingly, a battery replacement apparatus and a battery replacement method by which a battery can be reliably attached to an electric vehicle are desired.

The present disclosure has been made to solve the problem described above, and is aimed at providing a battery replacement apparatus and a battery replacement method by which a battery can be reliably attached to an electric vehicle.

A battery replacement apparatus according to a first aspect of the present disclosure is a battery replacement apparatus for replacing a first battery attached to an electric vehicle with a second battery, the battery replacement apparatus including: a detector that detects at least one of position and orientation of the first battery; a battery mount where the second battery is placed, the battery mount being capable of being raised; and an adjuster that adjusts at least one of position and orientation of the second battery that is placed on the battery mount. The battery mount allows the second battery to be attached to a vehicle body of the electric vehicle from below the vehicle body, by being raised below the vehicle body in a state where the second battery is placed on the battery mount. The adjuster adjusts at least one of the position and the orientation of the second battery placed on the battery mount, based on at least one of the position and the orientation of the first battery detected by the detector.

As described above, with the battery replacement apparatus according to the first aspect of the present disclosure, at least one of the position and the orientation of the second battery placed on the battery mount is adjusted by the adjuster based on at least one of the position and the orientation of the first battery detected by the detector. Accordingly, even when the position and the orientation of the second battery placed on the battery mount are not constant, the second battery may be easily adjusted, by the adjuster, to the position and the orientation suitable for attachment to the electric vehicle. As a result, the second battery may be more reliably attached to the electric vehicle.

In some embodiments, with the battery replacement apparatus according to the first aspect, the adjuster is driven independently of the battery mount. According to such a configuration, the second battery may be adjusted to the position and the orientation suitable for attachment to the electric vehicle regardless of position and orientation of the battery mount.

In some embodiments, with the battery replacement apparatus according to the first aspect, the adjuster includes a pre-fixer that pre-fixes a position, in a horizontal direction, of a corner portion of the second battery placed on battery mount, and adjusts at least one of the position and the orientation of the second battery in a state where the position of the corner portion is pre-fixed by the pre-fixer. According to such a configuration, at least one of the position and the orientation of the second battery may be adjusted with reference to the position of the corner portion that is pre-fixed. As a result, control by the adjuster may be simplified.

In this case, the second battery is rectangular-shaped in plan view. Furthermore, the pre-fixer is L-shaped in plan view. According to such a configuration, movement of the second battery (the corner portion thereof) may be restricted from two directions by the pre-fixer that is L-shaped. As a result, the second battery may be more reliably temporarily fixed.

A battery replacement method according to a second aspect of the present disclosure is a battery replacement method for replacing a first battery attached to an electric vehicle with a second battery by using a battery replacement apparatus. The battery replacement method includes detecting at least one of position and orientation of the first battery; placing the second battery on a battery mount that is provided in the battery replacement apparatus and that is capable of being raised; adjusting at least one of position and orientation of the second battery that is placed on the battery mount, based on at least one of the position and the orientation of the first battery detected in the detecting; and attaching the second battery to a vehicle body of the electric vehicle from below the vehicle body, by raising, below the vehicle body, the battery mount on which the second battery is placed, where at least one of the position and the orientation of the second battery is adjusted.

As described above, with the battery replacement method according to the second aspect of the present disclosure, at least one of the position and the orientation of the second battery placed on the battery mount is adjusted by an adjuster based on at least one of the position and the orientation of the first battery detected by a detector. Accordingly, there may be provided a battery replacement method by which the second battery may be more reliably attached to the electric vehicle.

The foregoing and other objects, features, aspects and advantages of the disclosure will become more apparent from the following detailed description of the disclosure when taken in conjunction with the accompanying drawings.

DESCRIPTION OF THE EMBODIMENTS

Figure 1:
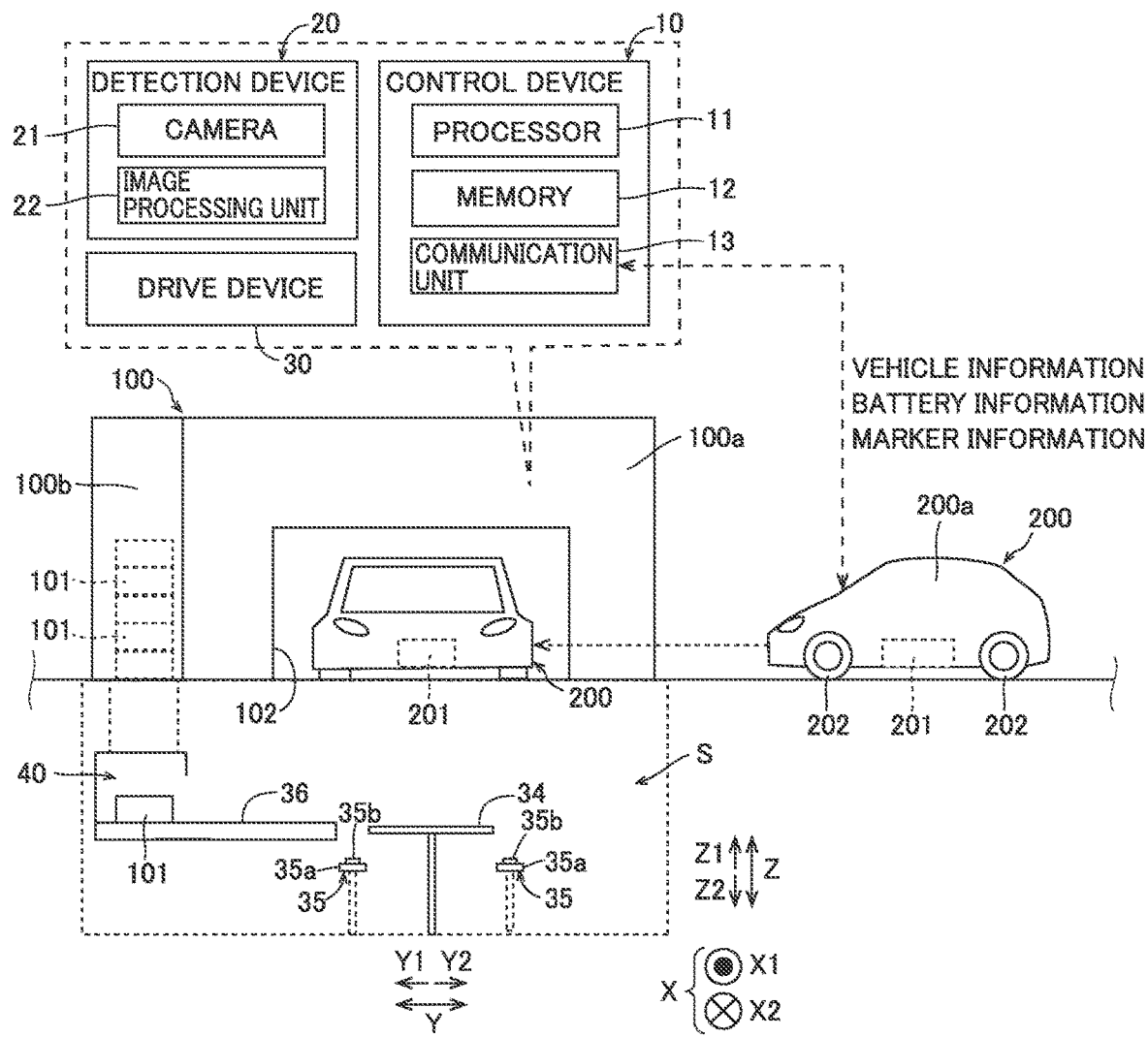
FIG. 1 is a diagram showing a configuration of a battery replacement apparatus according to an embodiment.

Hereinafter, an embodiment of the present disclosure will be described in detail with reference to the drawings. Same or corresponding parts in the drawings will be denoted by a same reference sign, and repeated description will be omitted.

(Configuration of Battery Replacement Apparatus)

FIG. 1 is a diagram showing a battery replacement apparatus 100 and an electric vehicle 200 according to a present embodiment. Battery replacement apparatus 100 is an apparatus for replacing a battery 201 attached to electric vehicle 200 with a battery 101. Battery replacement apparatus 100 includes a battery replacement station 100a where battery replacement is performed, and a container chamber 100b where battery 101 is housed. Container chamber 100b is provided annexed to battery replacement station 100a. An entrance 102 for allowing electric vehicle 200 to enter and leave is provided in battery replacement station 100a. Additionally, battery 201 and battery 101 are examples of a "first battery" and a "second battery" of the present disclosure.

Battery 101 housed in container chamber 100b is moved to a temporary depository 40 provided in an underfloor region S, and is then conveyed to electric vehicle 200. Additionally, a battery mount 34, a lift unit 35, and a conveyor unit 36, described later, are provided in underfloor region S.

Battery replacement apparatus 100 includes a control device 10, a detection device 20, and a drive device 30. Additionally, detection device 20 is an example of a "detector" of the present disclosure.

Control device 10 includes a processor 11, a memory 12, and a communication unit 13. Memory 12 stores, in addition to programs that are executed by processor 11, information that is used by the programs (such as maps, mathematical expressions, and various parameters). Although details will be given later, processor 11 controls drive device 30.

Communication unit 13 includes various communication I/Fs. Processor 11 controls communication unit 13. Communication unit 13 communicates with a DCM of electric vehicle 200, and the like. Communication unit 13 and electric vehicle 200 are capable of bidirectional communication. Additionally, communication unit 13 may also communicate with a mobile terminal or the like carried by a user of electric vehicle 200.

Furthermore, detection device 20 includes a camera 21 and an image processing unit 22. Details of detection device 20 will be given later.

Figure 2:
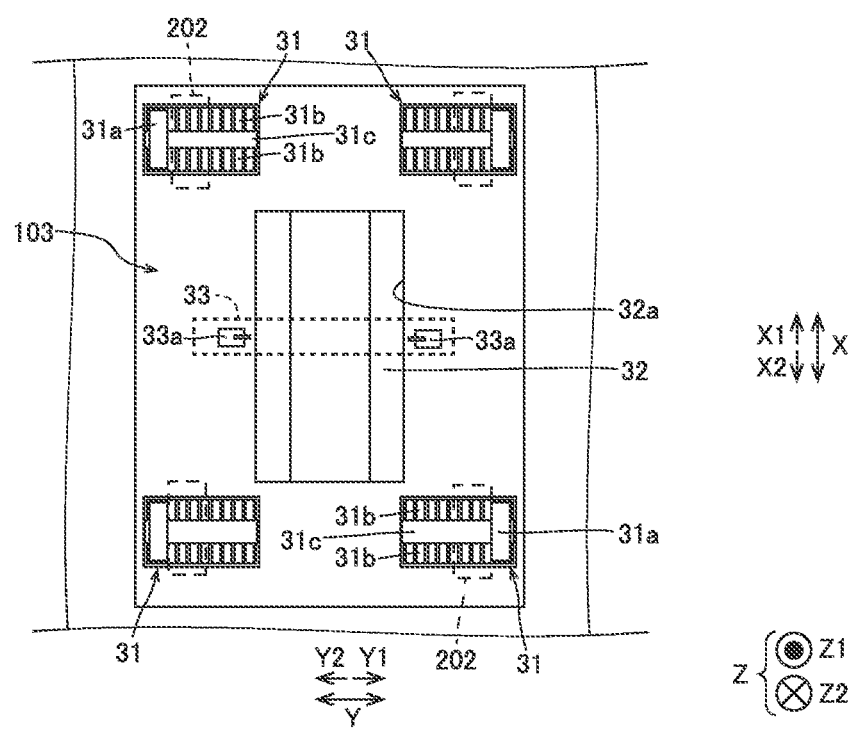
FIG. 2 is a plan view showing a vehicle stop region of the battery replacement apparatus according to the embodiment.

Furthermore, as shown in FIG. 2, battery replacement apparatus 100 is provided with a vehicle stop region 103. In a case where an operation instructing start of a battery replacement task is performed by a user through a navigation system, not shown, of electric vehicle 200 in a state where electric vehicle 200 is stopped in vehicle stop region 103, communication unit 13 receives an instruction signal for starting the battery replacement task from electric vehicle 200. Processor 11 starts control of the battery replacement task based on reception of the instruction signal by communication unit 13. Additionally, electric vehicle 200 stops in vehicle stop region 103 in such a way that a front-back direction is an X-direction and a left-right direction is a Y-direction.

Figure 3:
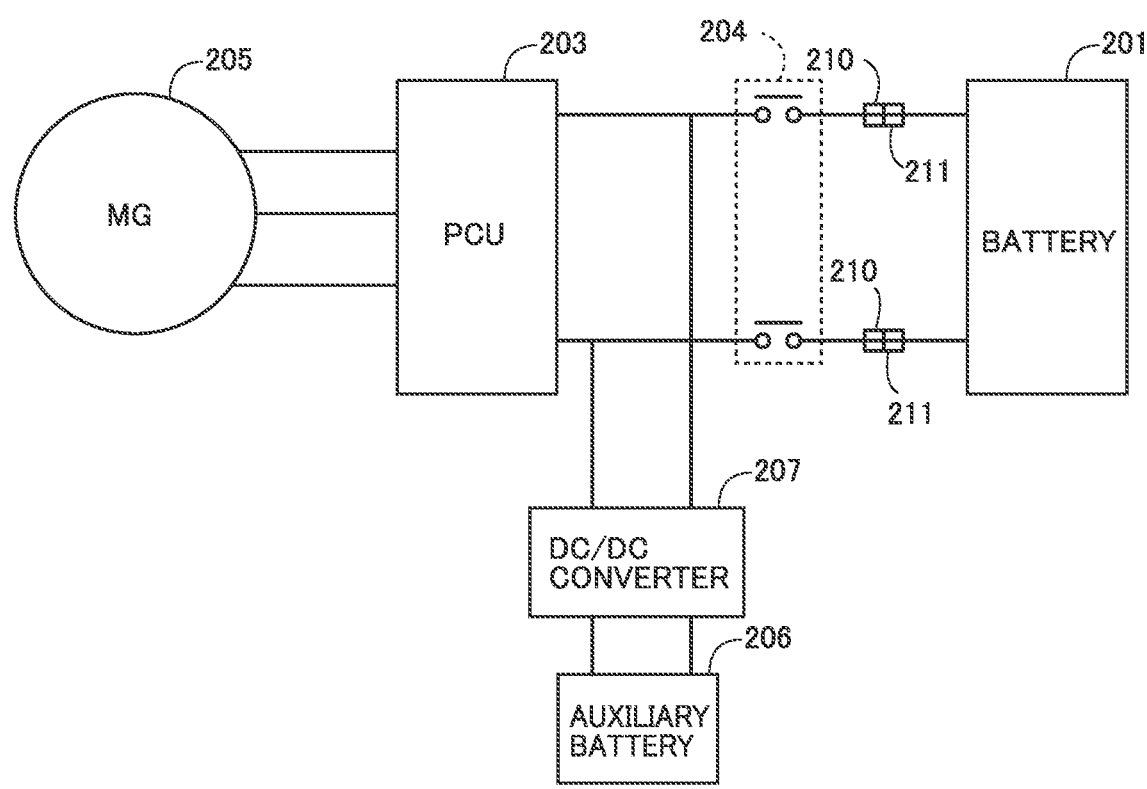
FIG. 3 is a diagram showing a configuration of an electric vehicle.

Furthermore, referring to FIG. 3, when an ignition power source (not shown) is placed in an off state, electric vehicle 200 places a system main relay (SMR) 204 connecting battery 201 and a power control unit (PCU) 203 in an off state. Battery 201 is thereby electrically separated from PCU 203 and a motor generator (MG) 205. When the operation instructing start of the battery replacement task is performed at electric vehicle 200 in this state, battery replacement apparatus 100 starts control of the battery replacement task. Furthermore, due to the operation described above being performed, locking between a vehicle connector 210 and a connector 211 of battery 201 is released. Additionally, after SMR 204 is placed in the off state, power from an auxiliary battery 206 is supplied to accessories such as MG 205 and the DCM via a DC/DC converter 207 and PCU 203.

Figure 13A:
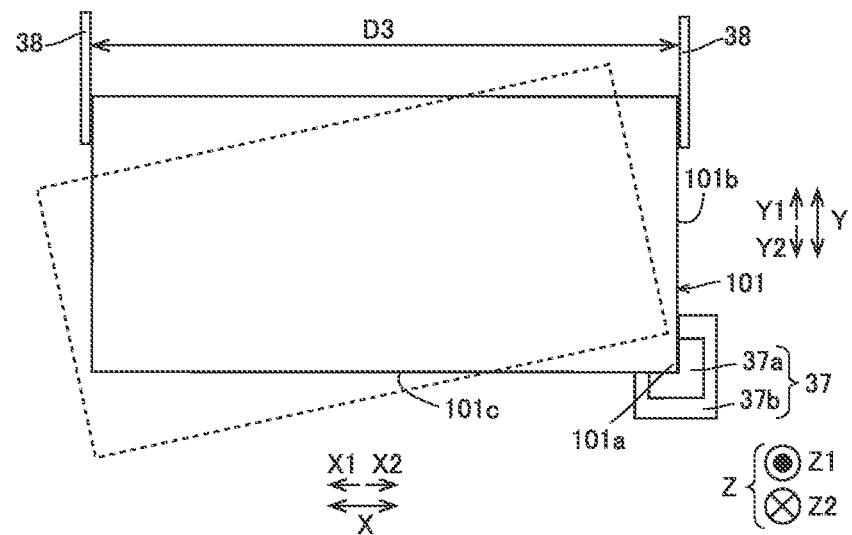
FIG. 13A is a schematic diagram showing a state where movement of the battery is restricted by a stopper section.

Furthermore, drive device 30 includes wheel stoppers 31 (see FIG. 2), a shutter 32 (see FIG. 2), a cleaning unit 33 (see FIG. 2), battery mount 34 (see FIG. 1), lift unit 35 (see FIG. 1), conveyor unit 36 (see FIG. 1), an adjuster 37 (see FIG. 5), and guide sections 38 (see FIG. 13A).

Referring again to FIG. 2, four wheel stoppers 31 are provided in vehicle stop region 103. Wheel stoppers 31 are provided for four wheels 202 of electric vehicle 200, respectively.

Wheel stopper 31 includes a pressing member 31a, a pair of side roller sections 31b, and a slider section 31c. Pressing member 31a is disposed across pair of side roller sections 31b and slider section 31c. Pressing member 31a moves wheel 202 by pressing wheel 202 from outer side (lateral side). Positioning of wheel 202 is thus performed by wheel stopper 31.

Side roller section 31b is provided on each of an X1 side and an X2 side of slider section 31c. Each of pair of side roller sections 31b is formed from a plurality of rollers, rotation axes of which extend in the X-direction. The plurality of rollers of side roller section 31b are disposed next to each other in the Y-direction. Pressing member 31a is moved in the Y-direction when the plurality of rollers of side roller section 31b are rotated.

Slider section 31c causes pressing member 31a placed on wheel stopper 31 to move in the X-direction. Slider section 31c may be of a conveyor belt type, for example. Additionally, the structure of wheel stopper 31 is not limited to the example described above. For example, side roller sections 31b or slider section 31c may be omitted.

Figure 7:
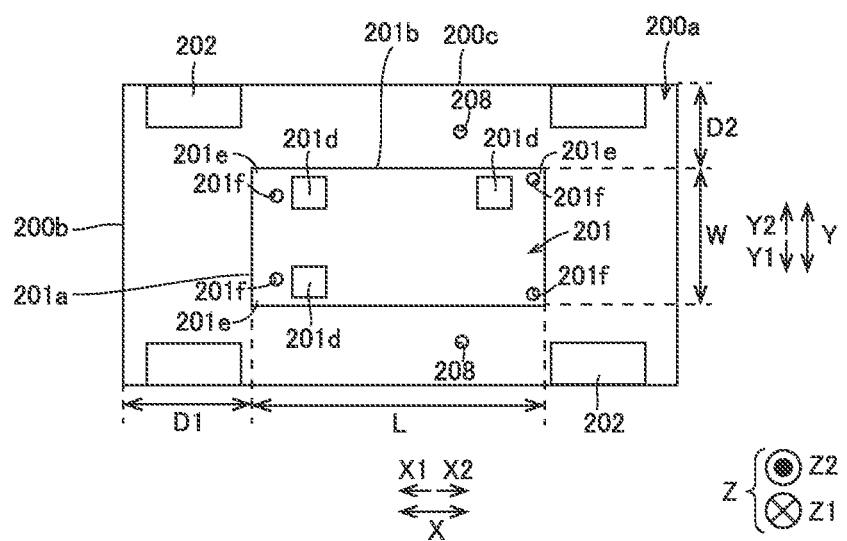
FIG. 7 is a bottom view showing the electric vehicle from below.

Furthermore, processor 11 performs control to clean battery 201 by controlling cleaning unit 33. Cleaning unit 33 includes two nozzles 33a, for example. Two nozzles 33a are provided to sandwich, in the Y-direction, an opening 32a for retracting battery 201 that is removed from electric vehicle 200. Nozzle 33a discharges water toward battery 201 from below battery 201. Battery 201 is thereby cleaned, and also, a plurality of markers 201d (see FIG. 7) provided on a bottom surface of battery 201 are cleaned. Additionally, plurality of markers 201d are provided near different corner portions 201e (see FIG. 7) of battery 201 having a rectangular shape in plan view (bottom view). Furthermore, the structure of cleaning unit 33 is merely an example, and is not restrictive.

Furthermore, opening 32a is exposed when shutter 32 is opened. FIG. 2 shows an example where shutter 32 is double-doored, but shutter 32 may instead be single-doored.

Figure 4:
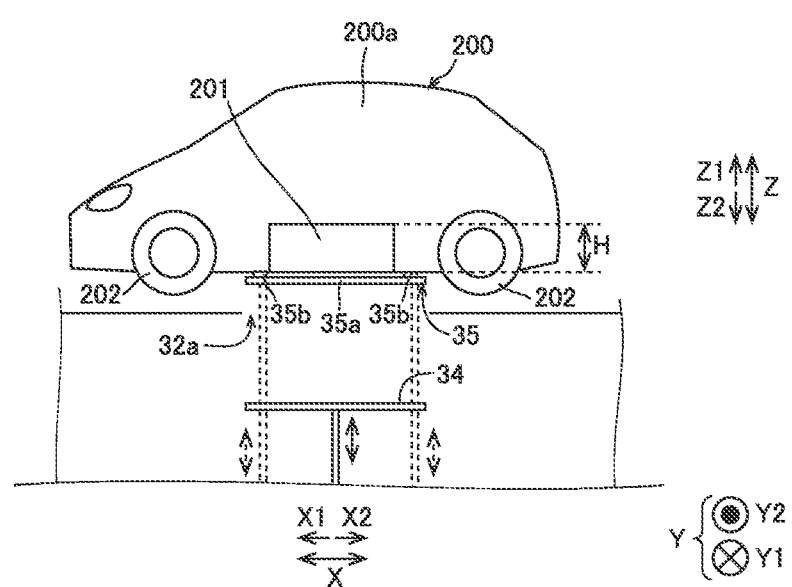
FIG. 4 is a schematic diagram showing a configuration under floor, in relation to the battery replacement apparatus according to the embodiment.

As shown in FIG. 4, lift unit 35 lifts or lowers electric vehicle 200 by being lifted or lowered in a state of holding electric vehicle 200 from below. Lift unit 35 is movable in an up-down direction (Z-direction) through opening 32a.

Lift unit 35 includes a pair of lift bars 35a. Two protruding portions 35b protruding on a Z1 side are provided on each of pair of lift bars 35a. Electric vehicle 200 is supported from below by two protruding portions 35b of each of pair of lift bars 35a (that is, by four protruding portions 35b).

Figure 5:
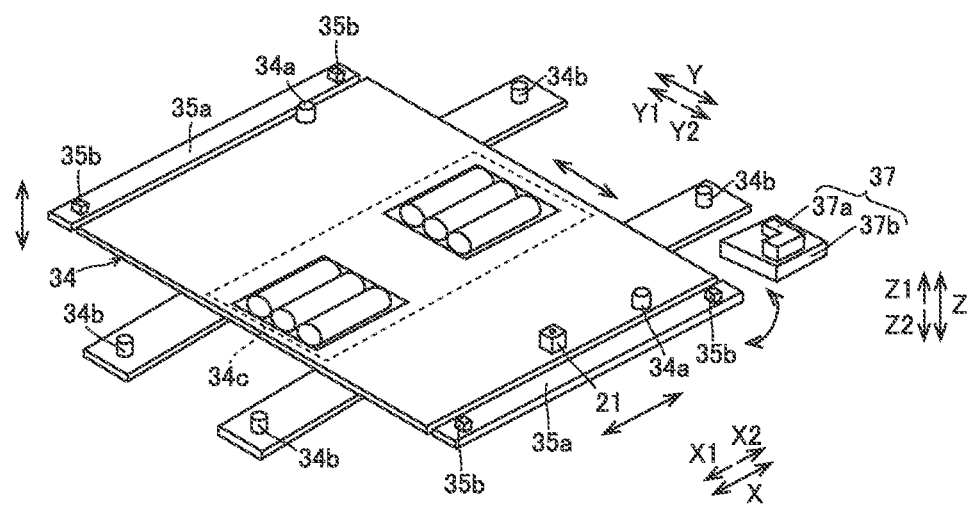
FIG. 5 is a perspective view showing a configuration of a battery mount of the battery replacement apparatus according to the embodiment.
Figure 9A:
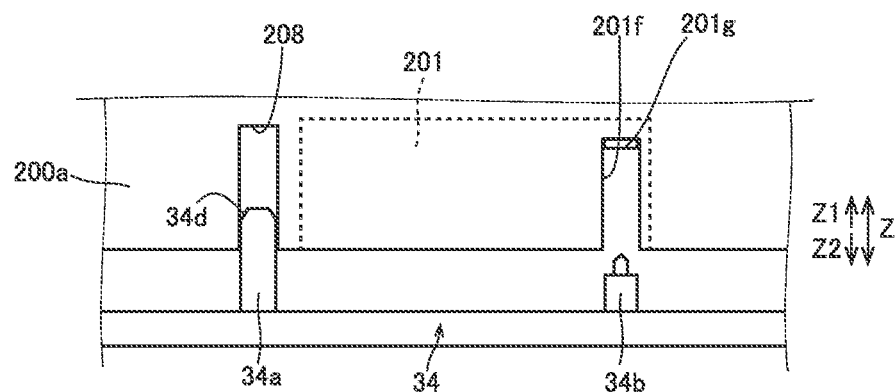
FIG. 9A is a schematic diagram of a state where a positioning pin is inserted in a pin insertion hole.

As shown in FIG. 5, battery mount 34 includes two positioning pins 34a, four locking/unlocking tools 34b, and a roller section 34c. Furthermore, camera 21 is mounted (fixed) on battery mount 34. For example, camera 21 is mounted on an edge portion of battery mount 34, on a Y2 side. Additionally, camera 21 may instead be provided at a part other than battery mount 34 (such as at lift bar 35a). Furthermore, camera 21 may be movable relative to battery mount 34. Additionally, a tapered surface 34d (see FIG. 9A) is provided at a tip end portion of positioning pin 34a. That is, positioning pin 34a is tapered toward the Z1 side.

Battery mount 34 is movable in a horizontal direction below electric vehicle 200. More specifically, battery mount 34 is movable in the X-direction (X1-direction, X2-direction) and the Y-direction (Y1-direction, Y2-direction). Furthermore, battery mount 34 is capable of rotating to change orientation (angle) on an XY plane. Additionally, each of pair of lift bars 35a may also be movable, as with battery mount 34.

Referring again to FIG. 1, conveyor unit 36 is capable of conveying a battery (201, 101). More specifically, conveyor unit 36 conveys battery 201 that is removed from electric vehicle 200 and placed on battery mount 34, to temporary depository 40. Battery 201 that is placed on battery mount 34 is moved to a Y1 side and placed on conveyor unit 36 due to roller section 34c (see FIG. 5) of battery mount 34 being rotated in a state where battery mount 34 is lowered to a same height position (a position in the Z-direction) as conveyor unit 36. Conveyor unit 36 then moves battery 201 to temporary depository 40. Additionally, conveyor unit 36 may be of conveyor belt type.

Furthermore, conveyor unit 36 moves battery 101 conveyed from container chamber 100b to temporary depository 40, to the Y2 side, and places the same on battery mount 34. At this time, battery 101 is moved to the Y2 side on battery mount 34 due to roller section 34c of battery mount 34 being rotated in an opposite direction from the case described above.

Referring again to FIG. 5, adjuster 37 includes a stopper section 37a and a movable section 37b. Stopper section 37a is disposed (fixed) on movable section 37b. Additionally, stopper section 37a is an example of a "pre-fixer" of the present disclosure.

Stopper section 37a restricts movement of battery 101 placed on battery mount 34, to each of the X2 side and the Y2 side. Stopper section 37a pre-fixes a position, in the horizontal direction, of a corner portion 101a (see FIG. 13A) of battery 101 placed on battery mount 34.

In plan view, stopper section 37a has an L-shape. Additionally, in plan view, battery 101 has a rectangular shape. Accordingly, stopper section 37a comes into contact with each of a surface 101b (see FIG. 13A) on the X2 side of battery 101 and a surface 101c (see FIG. 13A) on the Y2 side.

Furthermore, adjuster 37 is driven independently of battery mount 34. More specifically, movable section 37b where stopper section 37a is disposed is movable in the X-direction (the X1-direction, the X2-direction) and the Y-direction (the Y1-direction, the Y2-direction), independently of battery mount 34. Furthermore, movable section 37b is capable of rotating to change orientation (angle) on the XY plane, independently of battery mount 34.

(Battery Replacement Method)

Figure 6:
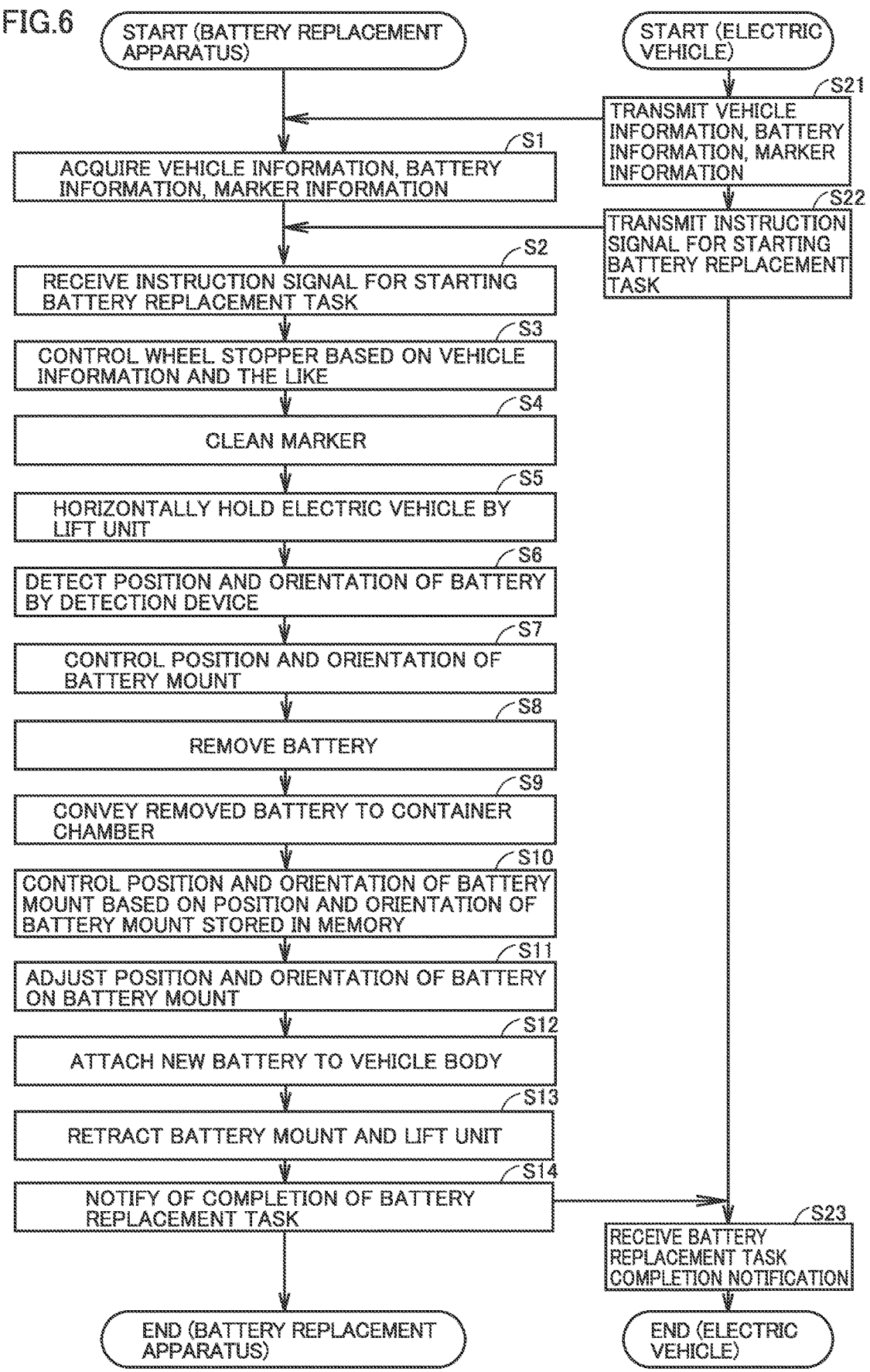
FIG. 6 is a flowchart showing each step by the battery replacement apparatus according to the embodiment.

Next, a battery replacement method that uses battery replacement apparatus 100 will be described with reference to a flowchart (sequence diagram) of FIG. 6.

[Transmission of Vehicle Information, etc.: Electric Vehicle]

First, in step S21, electric vehicle 200 transmits, to communication unit 13 of battery replacement apparatus 100, information about electric vehicle 200, information about battery 201, and information about markers 201d. For example, when an operation for transmission of each piece of information mentioned above through a navigation system, not shown, of electric vehicle 200 is performed, each piece of information mentioned above is transmitted to communication unit 13. Electric vehicle 200 transmits each piece of information mentioned above before entering battery replacement apparatus 100. Additionally, transmission of each piece of information mentioned above may be performed after electric vehicle 200 enters battery replacement apparatus 100.

[Acquisition of Vehicle Information, etc.: Battery Replacement Apparatus]

Next, in step S1, communication unit 13 of battery replacement apparatus 100 acquires, through communication, the information about electric vehicle 200, the information about battery 201, and the information about markers 201d that are transmitted from electric vehicle 200 in step S21. Each piece of the above-mentioned information that is acquired is stored in memory 12 (see FIG. 1).

More specifically, communication unit 13 acquires information about a size (size class) of electric vehicle 200. The information about the size of electric vehicle 200 includes information about an overall length and a vehicle width of electric vehicle 200. Furthermore, the information about the size of electric vehicle 200 may include information about a vehicle height and a ground clearance of electric vehicle 200.

Furthermore, communication unit 13 acquires information about a size of battery 201. More specifically, communication unit 13 acquires information about a length L (see FIG. 7) and a width W (see FIG. 7) of battery 201. Additionally, communication unit 13 may also acquire information about a height H (see FIG. 4) of battery 201.

Communication unit 13 further acquires position information of battery 201. More specifically, communication unit 13 acquires position information of battery 201 relative to a vehicle body 200a of electric vehicle 200. For example, communication unit 13 acquires information about a distance D1 (see FIG. 7) between a front end portion 200b (see FIG. 7) of vehicle body 200a and a front end portion 201a (see FIG. 7) of battery 201. Communication unit 13 also acquires information about a distance D2 (see FIG. 7) between a side end portion 200c (see FIG. 7) of vehicle body 200a and a side end portion 201b (see FIG. 7) of battery 201. Additionally, the position information of battery 201 is not limited to the example mentioned above.

Communication unit 13 may also acquire information about capacity (charge capacity) of battery 201 and state of charge (SOC) of battery 201.

Moreover, information about marker 201d (hereinafter "marker information") includes position information, information about shape, and information about model (such as information about size and color) of each of plurality of markers 201d. Additionally, the position information of markers 201d includes information about a position (coordinates) of each of plurality of markers 201d in a region where battery 201 is disposed, information about positional relationship among plurality of markers 201d, and the like.

[Transmission of Instruction Signal for Battery Replacement Task: Electric Vehicle]

Next, in step S22, electric vehicle 200 stopped in vehicle stop region 103 transmits the instruction signal for starting the battery replacement task to communication unit 13. Additionally, after transmitting the instruction signal to communication unit 13, electric vehicle 200 turns off SMR 204 (see FIG. 3). At this time, communication between electric vehicle 200 and communication unit 13 is maintained by supply of power from auxiliary battery 206 (see FIG. 3).

[Reception of Instruction Signal for Battery Replacement Task: Battery Replacement Apparatus]

Next, in step S2, communication unit 13 receives the instruction signal transmitted by electric vehicle 200 in step S22. Additionally, in step S2, after the instruction signal is received, processor 11 may transmit an instruction message or the like for placing the ignition power source in an off state, to a user of electric vehicle 200 through communication unit 13.

[Control of Wheel Stopper: Battery Replacement Apparatus]

Next, in step S3, processor 11 adjusts the position of wheel stopper 31 (see FIG. 2) based on the information (vehicle information and battery information) acquired in step S1 through communication unit 13.

More specifically, processor 11 controls driving of pair of side roller sections 31b (see FIG. 2) based on information about the vehicle width of electric vehicle 200. Furthermore, processor 11 controls driving of slider section 31c (See FIG. 2) based on the overall length of electric vehicle 200. Moreover, processor 11 controls wheel stopper 31 (side roller sections 31b and slider section 31c) based on the position information of battery 201 relative to vehicle body 200a. Positions of each pressing member 31a in the X-direction and the Y-direction are thereby adjusted by such control. Additionally, processor 11 may control four wheel stoppers 31 independently of each other.

In this manner, position and orientation of vehicle body 200a in the horizontal direction are adjusted, and also, position and orientation of battery 201 in the horizontal direction are adjusted. As a result, battery 201 may be moved to a predetermined position above opening 32a.

[Cleaning of Marker: Battery Replacement Apparatus]

Next, in step S4, processor 11 cleans battery 201 by controlling nozzles 33a (see FIG. 2) of cleaning unit 33. Markers 201d provided on battery 201 are thereby cleaned. Additionally, cleaning refers not only to removal of stains and foreign substances, but also to removal of snow and ice attached to a lower surface of the vehicle body. Removal of snow and ice is performed using snow-melting agent, hot water, hot air, and the like, for example.

[Horizontal Holding of Vehicle Body: Battery Replacement Apparatus]

Next, in step S5, processor 11 places shutter 32 in an open state, and causes lift bars 35a to be raised in a state where shutter 32 is in the open state. Accordingly, lift bars 35a pass through opening 32a, and electric vehicle 200 is lifted by lift bars 35a (see FIG. 4). Then, processor 11 raises lift bars 35a to a predetermined height position, and electric vehicle 200 is thereby held in parallel to the horizontal direction. Additionally, FIG. 4 shows a state where wheels 202 are separated from the ground, but wheels 202 may instead be in contact with the ground.

In step S5, processor 11 may adjust a distance by which lift bars 35a are raised, based on information about the ground clearance of electric vehicle 200 acquired in step S1. At this time, lift unit 35 may be controlled such that the ground clearance of electric vehicle 200 becomes constant.

Furthermore, in step S5, processor 11 may change a distance (not denoted by a reference sign) between lift bars 35a based on the vehicle width of electric vehicle 200. Furthermore, FIG. 5 shows an example where a positional relationship between two protruding portions 35b of each lift bar 35a is constant, but the positional relationship between two protruding portions 35b may instead be adjusted based on the overall length of electric vehicle 200 or the like.

[Detection of Position and Orientation of Battery: Battery Replacement Apparatus]

Next, in step S6, detection device 20 (see FIG. 1) detects position and orientation of battery 201 of electric vehicle 200 held by lift unit 35.

More specifically, camera 21 acquires an image of three markers 201d (see FIG. 7) provided on the bottom surface of battery 201 by capturing battery 201 from below (a Z2 side). Then, image processing unit 22 detects position and orientation of battery 201 based on the image of markers 201d acquired by camera 21.

Here, detection device 20 (image processing unit 22) detects markers 201d based on the marker information acquired by communication unit 13 in step S1. Image processing unit 22 identifies markers 201d in the image acquired by camera 21, based on at least one of positional relationship between markers 201d, information about the shape of markers 201d, and information about the model of markers 201d, included in the marker information. For example, image processing unit 22 determines a subject whose shape and model match the information about the shape and model of marker 201d that is acquired, to be marker 201d. Furthermore, image processing unit 22 determines a plurality of subjects with a positional relationship that matches the information about the positional relationship between markers 201d that is acquired, to be markers 201d.

Then, image processing unit 22 calculates (detects) a region where battery 201 is disposed, based on the positional relationship and the like of three markers 201d. More specifically, image processing unit 22 detects position and orientation of battery 201 in the horizontal direction. That is, image processing unit 22 detects, in relation to battery 201, a position in the X-direction, a position in the Y-direction, and orientation (angle) on the XY plane. Furthermore, the position and orientation of battery 201 detected at this time are stored in memory 12.

Furthermore, image processing unit 22 detects a position (a height position) of battery 201 in the up-down direction (the Z-direction) based on the positional relationship and the like of three markers 201d.

[Control of Position and Orientation of Battery Mount: Battery Replacement Apparatus]

Next, in step S7, processor 11 controls position and orientation of battery mount 34 in the horizontal direction based on the position and orientation of battery 201 in the horizontal direction detected by image processing unit 22 in step S6.

Figure 8A:
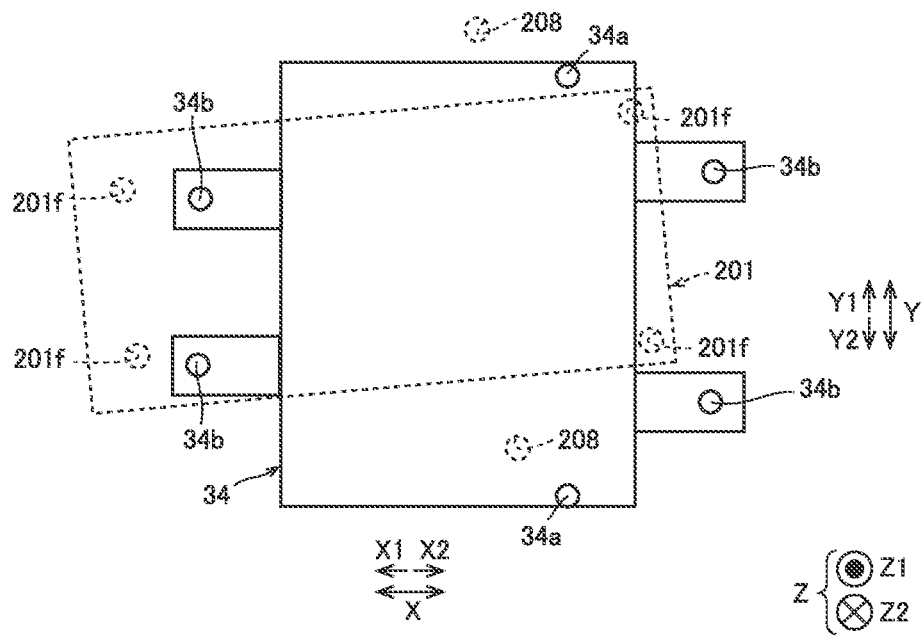
FIG. 8A is a schematic diagram of a state where positions of the battery mount and a battery are shifted from each other in a horizontal direction.
Figure 8B:
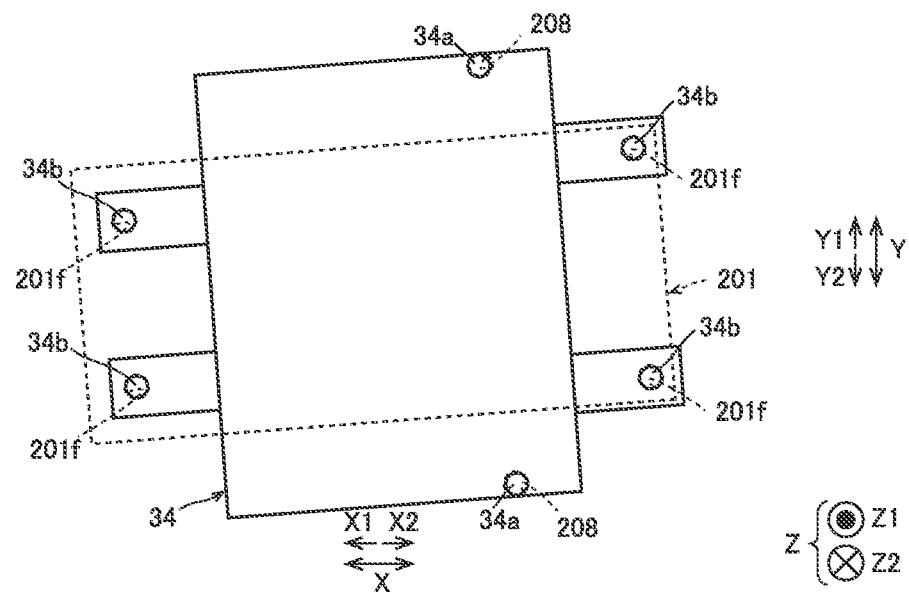
FIG. 8B is a schematic diagram of a state where the shift in the positions of the battery mount and the battery in the horizontal direction is eliminated.

FIG. 8A is a plan view showing a state where positions of battery 201 (see dashed line) of electric vehicle 200 and battery mount 34 are shifted. When the position and orientation of battery mount 34 are controlled in such a state, a positional shift between battery 201 and the battery mount 34 is eliminated (see FIG. 8B). Additionally, FIG. 8A and FIG. 8B are plan views relative to electric vehicle 200.

More specifically, the position and orientation of battery mount 34 are controlled such that positioning pins 34a of battery mount 34 and pin insertion holes 208 provided in electric vehicle 200 overlap in plan view. Locking/unlocking tools 34b of battery mount 34 and tool insertion holes 201f provided in electric vehicle 200 (battery 201) thereby overlap in plan view. Furthermore, the position and orientation of battery mount 34 that are controlled at this time are stored in memory 12. Additionally, the position and orientation, in the horizontal direction, of at least one of positioning pin 34a and locking/unlocking tool 34b may be controlled independently of battery mount 34.

[Removal of Battery: Battery Replacement Apparatus]

Figure 9B:
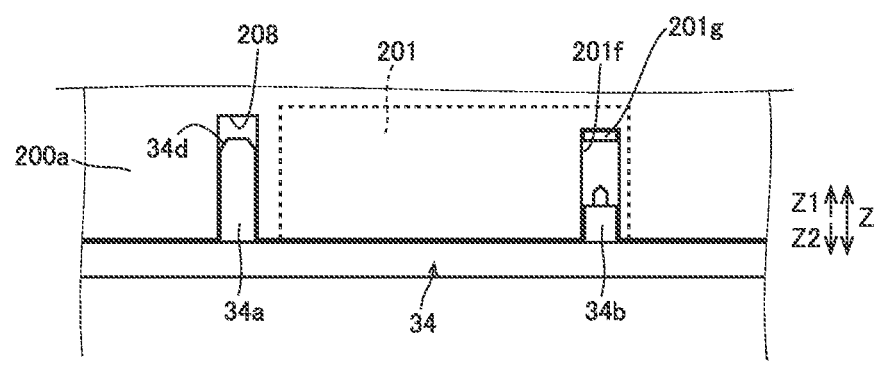
FIG. 9B is a schematic diagram of a state where a locking/unlocking tool is inserted in a tool insertion hole.

Next, in step S8, battery 201 is removed from vehicle body 200a of electric vehicle 200. First, processor 11 raises battery mount 34 by a distance that is based on the information about the height position of battery 201 acquired in step S6. Accordingly, positioning pins 34a are inserted into pin insertion holes 208, and locking/unlocking tools 34b are inserted into tool insertion holes 201f (see FIG. 9B). As a result, battery mount 34 is positioned relative to electric vehicle 200 (battery 201). Additionally, at this time, positioning pins 34a are inserted into pin insertion holes 208 before locking/unlocking tools 34b are inserted into tool insertion holes 201f (see FIG. 9A). Furthermore, the height position of battery mount 34 that is raised at this time is stored in memory 12. Additionally, the distance by which battery mount 34 is raised may be controlled to be constant at all times.

Figure 9C:
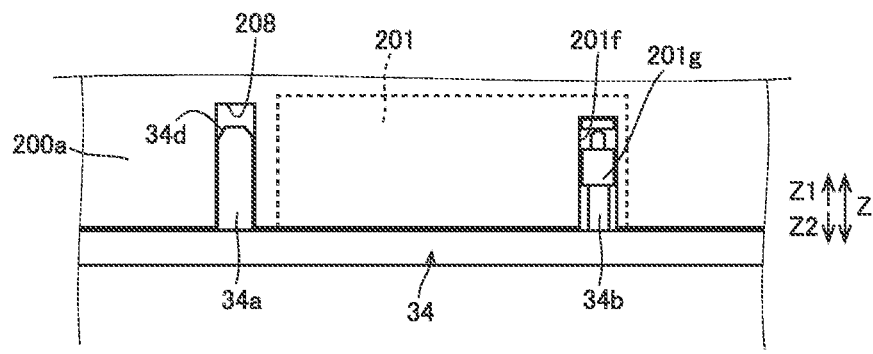
FIG. 9C is a schematic diagram of a state where unlocking is being performed with the locking/unlocking tool.

Next, as shown in FIG. 9C, processor 11 raises locking/unlocking tools 34b in a state where locking/unlocking tools 34b are inserted in tool insertion holes 201f. Then, processor 11 drives (rotates) locking/unlocking tools 34b inserted in tool insertion holes 201f. Bolts 201g inside tool insertion holes 201f are thereby unlocked. As a result, battery 201 is removed from vehicle body 200a, and is placed on battery mount 34. Additionally, a timing of insertion of positioning pins 34a into pin insertion holes 208 and a timing of insertion of locking/unlocking tools 34b into tool insertion holes 201f may be the same.

[Conveying of Battery to Container Chamber: Battery Replacement Apparatus]

Figure 10A:
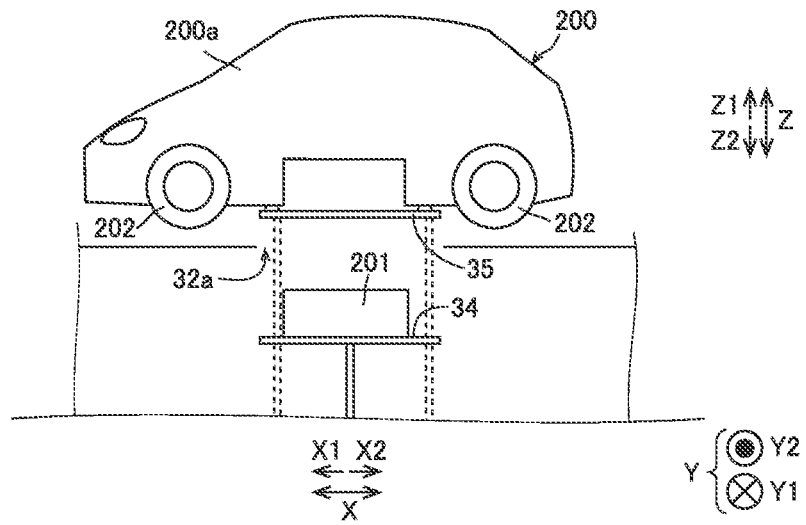
FIG. 10A is a schematic diagram of a state where the battery removed from the electric vehicle is moved downward by the battery mount.
Figure 10B:
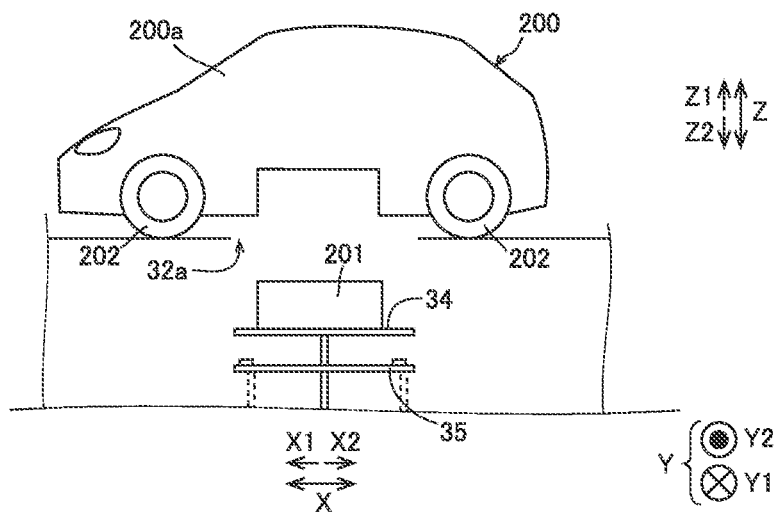
FIG. 10B is a schematic diagram of a state where a lift unit is retracted downward.
Figure 10C:
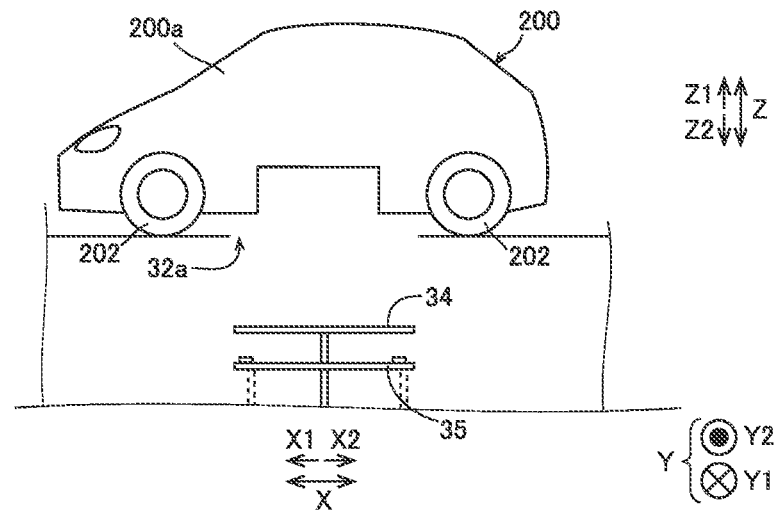
FIG. 10C is a schematic diagram of a state where the battery is housed in a container chamber.

Next, in step S9, battery 201 removed from vehicle body 200a in step S8 is conveyed to container chamber 100b (see FIG. 1). First, as shown in FIG. 10A, processor 11 lowers battery mount 34 on which battery 201 is placed, to a height position of conveyor unit 36 (see FIG. 1). Next, as shown in FIG. 10B, processor 11 lowers lift unit 35 (lift bars 35a) to a position lower than battery mount 34. Vehicle body 200a of electric vehicle 200 is thereby placed on the ground without being held by lift bars 35a. Next, processor 11 drives roller section 34c (see FIG. 5) of battery mount 34. Battery 201 placed on battery mount 34 is thereby moved to the Y1 side (a conveyor unit 36 side) by roller section 34c, and is conveyed out from battery mount 34 (see FIG. 10C). Then, after being conveyed to temporary depository 40 by conveyor unit 36, battery 201 is housed in container chamber 100b.

[Control of Position and Orientation of Battery Mount: Battery Replacement Apparatus]

Figure 11A:
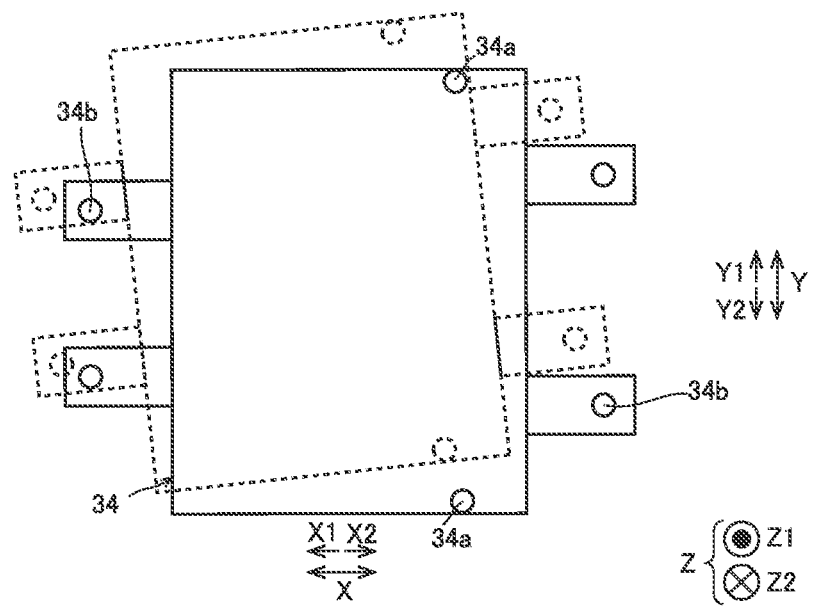
FIG. 11A is a schematic diagram showing a state where a position of the battery mount is shifted from a position of the battery mount stored in a memory.
Figure 11B:
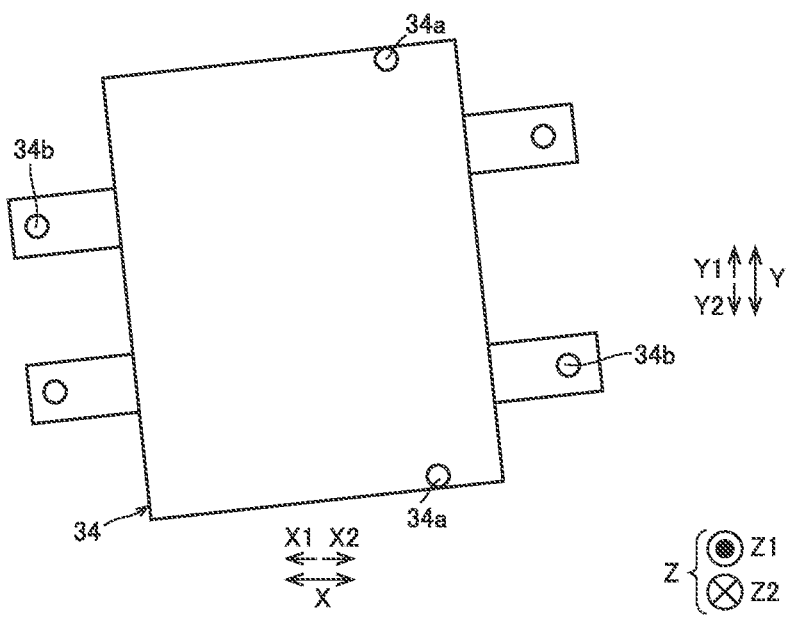
FIG. 11B is a schematic diagram showing a state where the position of the battery mount overlaps the position of the battery mount stored in the memory.

Next, in step S10, processor 11 controls the position and orientation of battery mount 34 by moving battery mount 34 based on the position and orientation of battery mount 34 stored in memory 12 in step S7. More specifically, in the case (see FIG. 11A) where there is a shift between the position and orientation of battery mount 34 and the position and orientation of battery mount 34 stored in memory 12 (see dashed line in FIG. 11A), processor 11 moves and rotates battery mount 34 in the horizontal direction in such a way that the shift is eliminated (see FIG. 11B).

[Adjustment of Position and Orientation of Battery on Battery Mount: Battery Replacement Apparatus]

Figure 12A:
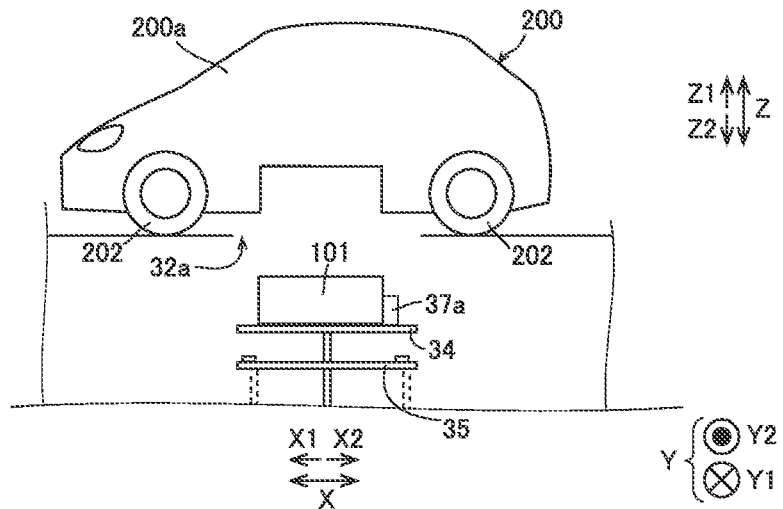
FIG. 12A is a schematic diagram showing a state where the battery is mounted on the battery mount.

Next, in step S11, processor 11 adjusts the position and orientation of battery 101 placed on battery mount 34. More specifically, processor 11 adjusts the position and orientation of battery 101 by using stopper section 37a (see FIGS. 5 and 12A).

First, processor 11 moves battery 101 from container chamber 100b to temporary depository 40. Then, processor 11 moves battery 101 from temporary depository 40 to battery mount 34 by controlling conveyor unit 36. Furthermore, processor 11 moves battery 101 placed on battery mount 34 to the Y2 side by controlling roller section 34c of battery mount 34. At this time, battery 101 moved by roller section 34c stops by coming into contact with stopper section 37a. Movement of battery 101 to the X2 side and the Y2 is restricted by stopper section 37a (see FIG. 13A). A position of corner portion 101a (see FIG. 13A) of battery 101 in the horizontal direction is thereby pre-fixed.

Additionally, battery 101 may be moved to the Y2 side by being guided by pair of guide sections 38 (see FIG. 13A). Furthermore, processor 11 may adjust a distance D3 (see FIG. 13A) between pair of guide sections 38 based on information about battery 101 (information about size, type, and the like).

Figure 13B:
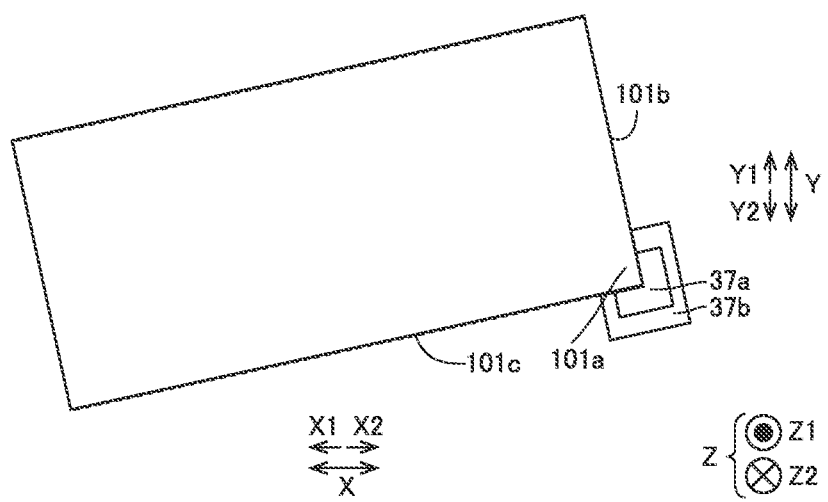
FIG. 13B is a schematic diagram showing a state where position and orientation of the battery are adjusted by a movable section.

Then, processor 11 adjusts the position and orientation of battery 101 in a state where the position of the corner portion 101a is pre-fixed by stopper section 37a. More specifically, processor 11 adjusts the position and orientation of battery 101 placed on battery mount 34, based on the position and orientation of battery 201 stored in memory 12 in step S6 (see broken line in FIG. 13A). More specifically, as shown in FIG. 13B, processor 11 moves stopper section 37a (movable section 37b) in such a way that the position and orientation, in the horizontal direction, of battery 101 placed on battery mount 34 become the same as the position and orientation, in the horizontal direction, of battery 201 stored in memory 12. Additionally, battery mount 34 is stopped while stopper section 37a (movable section 37b) is being moved.

Additionally, position alignment of battery 101 and battery mount 34 relative to each other may be performed by adjuster 37. In this case, control of the position and orientation of battery mount 34 (control in step S10) may be performed after position alignment of battery 101 and battery mount 34 is performed.

[Attachment of Battery: Battery Replacement Apparatus]

Figure 12B:
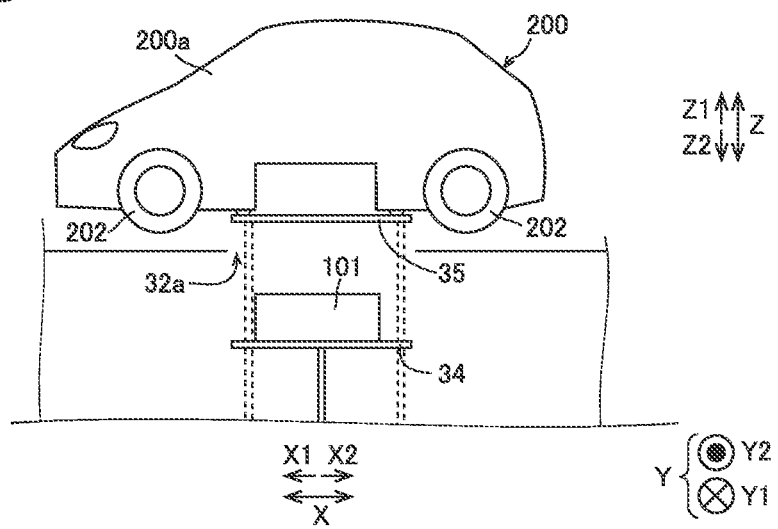
FIG. 12B is a schematic diagram showing a state where the electric vehicle is raised by the lift unit.

Next, in step S12, processor 11 performs control of attaching battery 101 to vehicle body 200a. More specifically, processor 11 raises lift unit 35 (lift bars 35a) to same height position as lift unit 35 (lift bars 35a) raised in step S5. Vehicle body 200a is thereby held in parallel with the horizontal direction at the same height position as vehicle body 200a held by lift unit 35 (lift bars 35a) in step S5 (see FIG. 12B). Additionally, before such control, processor 11 may move lift unit 35 in the horizontal direction such that the position of lift unit 35 in the horizontal direction becomes the same as the position of lift unit 35 in the horizontal direction in step S5.

Figure 12C:
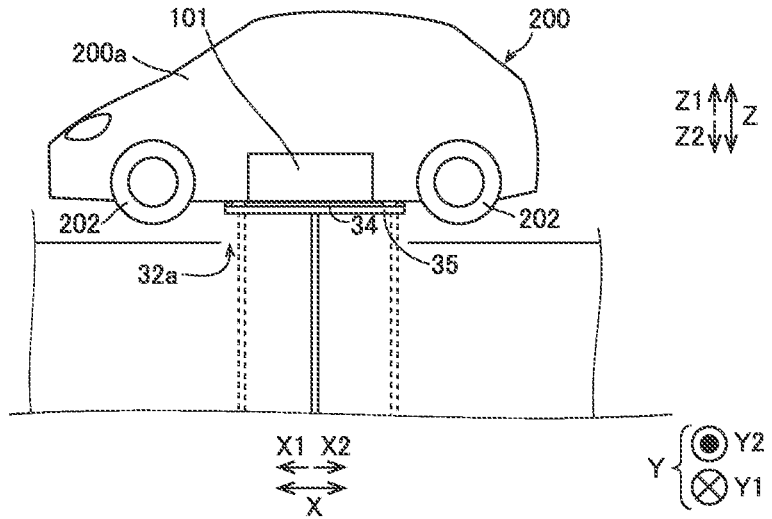
FIG. 12C is a schematic diagram showing a state where the battery is attached to the electric vehicle.

Next, as shown in FIG. 12C, processor 11 raises battery mount 34 to the height position of battery mount 34 stored in memory 12 in step S8. Positioning pins 34a (see FIG. 5) are thereby inserted in pin insertion holes 208 (see FIG. 7). In this state, processor 11 raises locking/unlocking tools 34b. Locking/unlocking tools 34b are thereby inserted into tool insertion holes, not shown, of battery 101. Then, processor 11 drives (rotates) locking/unlocking tools 34b, and bolts, not shown, in the tool insertion holes are locked. When locking of all the bolts is detected, vehicle connector 210 and a connector, not shown, of battery 101 are locked. As a result, attachment of battery 101 to vehicle body 200a is completed. Additionally, stopper section 37a may be retracted (moved away from battery 101) before battery mount 34 is raised.

[Retraction of Battery Mount and Lift Unit: Battery Replacement Apparatus]

Next, in step S13, processor 11 lowers and retracts battery mount 34 and lift unit 35 from electric vehicle 200. Then, processor 11 places shutter 32 (see FIG. 2) in a closed state.

[Notification of Battery Replacement Task Completion: Battery Replacement Apparatus]

Next, in step S14, processor 11 notifies electric vehicle 200, through communication unit 13, of completion of the battery replacement task.

[Reception of Battery Replacement Task Completion Notification: Electric Vehicle]

Then, in step S23, electric vehicle 200 receives the notification transmitted from communication unit 13 of battery replacement apparatus 100 in step S14. Electric vehicle 200 is thereby placed in a state where the ignition power source can be turned on. Then, the process is ended.

As described above, in the present embodiment, adjuster 37 adjusts the position and orientation of battery 101 placed on battery mount 34, based on the position and orientation of battery 201 detected by detection device 20. Accordingly, the position and orientation of battery 101 may be easily adjusted by adjuster 37 regardless of the position and orientation of battery mount 34. Furthermore, the position and orientation of battery 101 may be adjusted without adjusting battery mount 34.

In the embodiment described above, an example is described where a position of drive device 30 is adjusted based on information about each of electric vehicle 200 and battery 201, but the present disclosure is not limited to such an example. The position of drive device 30 may be adjusted based on information about one of electric vehicle 200 and battery 201.

In the embodiment described above, an example is described where the position and orientation of battery 101 are adjusted by stopper section 37a being driven independently of battery mount 34, but the present disclosure is not limited to such an example. Stopper section 37a may work in conjunction with battery mount 34.

Figure 14:
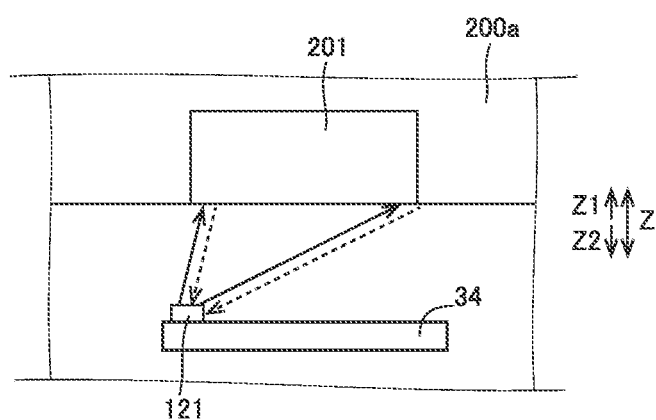
FIG. 14 is a schematic diagram showing a radar according to a modification of the embodiment.

In the embodiment described above, an example is described where the position and orientation of battery 201 are detected based on an image of markers 201d captured by camera 21, but the present disclosure is not limited to such an example. As shown in FIG. 14, the position and orientation of battery 201 may be detected using a radar 121 that emits radio waves (see solid arrows) to battery 201. More specifically, radar 121 detects a distance to battery 201 based on reflected waves (see dashed arrows) from battery 201. Additionally, there may be provided a plurality of radars 121.

Figure 15:
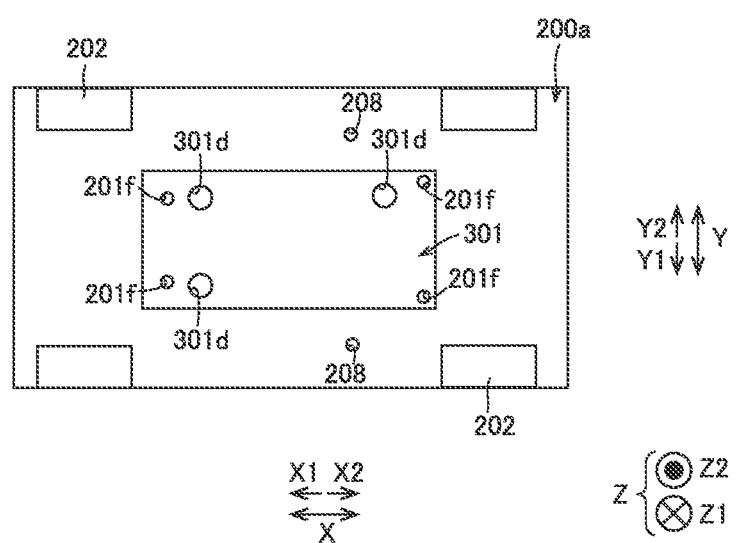
FIG. 15 is a diagram showing holes provided in the battery of the electric vehicle.

In the embodiment described above, an example is described where the position and orientation of battery 201 are detected based on an image of markers 201d captured by camera 21, but the present disclosure is not limited to such an example. As shown in FIG. 15, position and orientation of a battery 301 may be detected based on an image of a plurality of holes 301d provided in battery 301. Additionally, battery 301 is an example of the "first battery" of the present disclosure.

Although an embodiment of the present disclosure has been described, it is to be understood that the embodiment disclosed herein is by way of illustration and example only and is not to be taken by way of limitation. The scope of the present disclosure is indicated by the appended claims, and is intended to include all modifications within the scope and meaning equivalent to those of the claims.

What is claimed is:

1. A battery replacement apparatus for replacing a first battery attached to an electric vehicle with a second battery, the battery replacement apparatus comprising:
   a detector that detects at least one of position and orientation of the first battery;
   a battery mount where the second battery is placed, the battery mount being capable of being raised; and
   an adjuster that adjusts at least one of position and orientation of the second battery that is placed on the battery mount, wherein:
   the battery mount allows the second battery to be attached to a vehicle body of the electric vehicle from below the vehicle body, by being raised below the vehicle body in a state where the second battery is placed on the battery mount,
   the adjuster adjusts at least one of the position and the orientation of the second battery placed on the battery mount, based on at least one of the position and the orientation of the first battery detected by the detector,
   the adjuster includes a pre-fixer that pre-fixes a position, in a horizontal direction, of a corner portion of the second battery placed on the battery mount, and
   the adjuster adjusts at least one of the position and the orientation of the second battery in a state where the position of the corner portion is pre-fixed by the pre-fixer.

2. The battery replacement apparatus according to claim 1, wherein the adjuster is driven independently of the battery mount.

3. The battery replacement apparatus according to claim 1, wherein:
   the second battery is rectangular-shaped in plan view, and
   the pre-fixer is L-shaped in plan view.

4. A battery replacement method for replacing a first battery attached to an electric vehicle with a second battery by using a battery replacement apparatus, the battery replacement method comprising:
   detecting, by a detector, at least one of position and orientation of the first battery;
   placing the second battery on a battery mount that is provided in the battery replacement apparatus and that is capable of being raised;
   adjusting, by an adjuster, at least one of position and orientation of the second battery that is placed on the battery mount, based on at least one of the position and the orientation of the first battery detected in the detecting; and
   attaching the second battery to a vehicle body of the electric vehicle from below the vehicle body, by raising, below the vehicle body, the battery mount on which the second battery is placed, where at least one of the position and the orientation of the second battery is adjusted,
   wherein the adjuster includes a pre-fixer that pre-fixes a position, in a horizontal direction, of a corner portion of the second battery placed on the battery mount, and
   wherein the adjuster adjusts at least one of the position and the orientation of the second battery in a state where the position of the corner portion is pre-fixed by the pre-fixer.

* * * * *